Patented Apr. 17, 1923.                                                                   1,451,734

UNITED STATES PATENT OFFICE.

JOSEPH IRVING, OF BISBEE, ARIZONA.

LEACHING OF COPPER ORES AND RECOVERY OF COPPER.

No Drawing.          Application filed January 29, 1920. Serial No. 354,955.

*To all whom it may concern:*

Be it known that I, JOSEPH IRVING, a subject of the King of Great Britain, residing at Bisbee, in the county of Cochise and State of Arizona, have invented certain new and useful Improvements in Leaching of Copper Ores and Recovery of Copper; and I do hereby declare the following to be a full, clear, and exact description of the invention, such as will enable others skilled in the art to which it appertains to make and use the same.

My invention relates to a process for the treatment of cupriferous ores, compounds or products for the extraction and recovery of the metal values therein.

As is well known copper ores and the like are often treated with a leaching solution either in a heap or in a tank, in order to dissolve out the copper values contained therein, and the copper is deposited from such solution either by electrolysis or by precipitation with metallic iron, the leaching solution in such treatment generally containing iron sulfate and some sulfuric acid. The common practice is to use an amount of fresh leaching solution for treatment of the ore or the like and then to remove said leach, and leach again with fresh solution. Briefly stated, my improved process of recovering copper from cupriferous ores, compounds or products consists in increasing the copper content of the leach water, a sulfuric acid ferric sulfate leach, and then leaching the cupriferous, ore, compound or product, whether in heap or tank, with this leach water of increased copper content, the resulting liquor being then passed through a bed or filter of low grade manganese ore to decrease the ferric iron content, the copper thereafter being recovered either by electrolysis or precipitation. The original leach solution which has been once used for leaching a pyritic cupriferous mass is highly efficient for leaching another mass of ore or the like. The reaction which takes place is probably as follows:

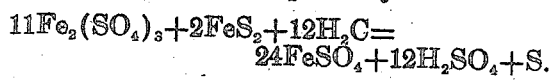
$$11Fe_2(SO_4)_3 + 2FeS_2 + 12H_2O = 24FeSO_4 + 12H_2SO_4 + S.$$

I have obtained the following results: The copper content of the ore was 1%. The copper content of the wash water or leaching solution first added to the mass was 0.27 lbs. per 1000 gallons before leaching, and after leaching it was 1.30 lbs. per 1000 gallons. This solution was then pumped back onto a fresh portion of the mass, which was leached out thereby, and the solution then was removed from the mass and found to have a copper content of 6.35 lbs. per 1000 gallons.

I have also discovered that the leaching power of the solution may be increased by passing it, on its way to the mass to be leached out, through a bed or filter of pyrites containing a small percentage of copper which gives to the leaching solution passing therethrough an addition content of copper and acid and which increases remarkably the leaching power of the solution, as is indicated by the following results: The leaching solution before passing through the pyrites bed contained 0.27 lbs. of copper per 1000 gallons and after passing through said bed it contained 8.50 lbs. of copper per 1000 gallons. This solution, after leaching out a mass of ore containing 1% of copper, contained 16 lbs. of copper per 1000 gallons.

I have accordingly increased the leaching power from 1.3 to 6.35 in the first instance and to 16 in the second.

A combination of the two above described processes for increasing the leaching power of the solution materially increases the leaching power thereof, that is the once used leach may be pumped onto a mass of ore, the solution however passing through a pyritic bed such as is described above, before it reaches said mass. The copper may be recovered from the leaching solution either by electrolysis or by precipitation with metallic iron, but the precipitation method will usually be chosen. I have found that in either case, a decrease in the content of ferric iron to a minimum is highly desirable, for the less ferric iron there is present the less current will be wasted in reducing it at the cathode in the electrolytic recovery of the copper; and with respect to the cementation or precipitation process of recovering the copper, less metallic iron will be wasted in reducing ferric iron as the ferric iron content is decreased.

I reduce the ferric iron content of the solution by passing it through a filter bed which may consist entirely of or contain low grade manganese ore.

I have found that on passing such a solution through a filter bed containing 28% of manganese the ferric iron content of the solution was reduced from the initial amount of 18 lbs. per 1000 gallons to 2 lbs. per 1000 gallons; and that on passing a solution as above through a filter bed containing 34% of manganese the reduction was from 18 to 1 lb. per 1000 gallons.

I claim as my invention:

1. The process of extracting copper from cupriferous ores, compounds or products, which includes increasing the leaching power of a sulfuric acid ferric sulfate leach by contacting it with a pyritic mass and leaching the cupriferous ore, compound or product therewith.

2. The process of extracting copper from cupriferous ores, compounds or products, which includes increasing the leaching power of a sulfuric acid ferric sulfate leach by contacting it with a pyritic mass and leaching the cupriferous ore, compound or product therewith.

3. The process of extracting copper from cupriferous ores, compounds or products, which includes increasing the leaching power of a sulfuric acid ferric sulfate leach by leaching a mass of material containing pyritic copper therewith, and then leaching the cupriferous ore.

4. The process of extracting copper from cupriferous ores, compounds or products, which includes increasing the leaching power of a sulfuric acid ferric sulfate leach by leaching a mass of material containing a small amount of pyritic copper therewith, and then leaching the cupriferous ore, compound or product with the resulting liquor.

5. The process of extracting copper from cupriferous ores, compounds or products, which includes increasing the leaching power of a sulfuric acid ferric sulfate leach by leaching a mass of pyritic material containing copper therewith, and leaching the cupriferous ore, compound or product with the resulting liquor.

6. The process of extracting copper from cupriferous ores, compounds or products, which includes increasing the leaching power of a sulfuric acid ferric sulfate leach by leaching a mass of pyritic material containing a small amount of copper therewith, and leaching the cupriferous ore, compound or product with the resulting liquor.

7. The process of reducing the iron and acid contents of a solution which includes passing said solution through a mass of manganese ore.

8. The process of reducing the iron and acid contents in a sulfuric acid solution which includes passing said solution through a mass of manganese ore.

9. The process of reducing the iron and acid contents of a solution which includes passing said solution through a mass containing low grade manganese ore.

10. The process of recovering copper from cupriferous ores, compounds or products which includes passing sulfuric acid ferric sulfate leaching solution through a mass containing pyritic copper, leaching the cupriferous ore, compound or product with the resulting liquid, decreasing the ferric iron content of said liquid and recovering the copper as such from the liquid by a method which would be hindered and less economic than if the ferric iron content were not decreased.

11. The process of recovering copper from cupriferous ores, compounds or products, which includes passing a sulfuric acid ferric sulfate leaching solution through a pyritic mass, leaching the cupriferous ore, compound or product with the resulting liquid, decreasing the ferric iron content of said liquid and then recovering the copper as such from the liquid by a method which would be hindered and less economic than if the ferric iron content were not decreased.

12. The process of recovering copper from cupriferous ores, compounds or products, which includes passing a sulfuric acid ferric sulfate leaching solution through a cupriferous pyritic mass, leaching the cupriferous ore, compound or product with the resulting liquid, decreasing the ferric iron content of said liquid and then recovering the copper as such from the liquid by a method which would be hindered and less economic than if the ferric iron content were not decreased.

13. The process of recovering copper from cupriferous ores, compounds or products which includes increasing the leaching power of a sulfuric acid ferric sulfate leach by contacting it with a pyritic mass, leaching the cupriferous ore, compound or product therewith, passing the leach containing the copper through a filter bed of material containing manganese and recovering the copper as such from the liquid by a method which would be hindered and less economic than if the ferric iron content were not decreased.

14. The process of obtaining copper from cupriferous ores, compounds or products, which includes passing a sulfuric acid ferric sulfate leach through a mass containing a relatively small amount of pyritic copper to increase its leaching power, leaching the cupriferous ore, compound or product therewith, passing the resulting liquor through a filter bed of low grade manganese ore to decrease the ferric iron content and recovering the copper as such by a method which would be hindered and less economic than if the ferric iron content were not decreased.

15. The process of extracting copper from cupriferous ores, compounds or products, which includes increasing the leaching power of a leach by leaching a pyritic mass, compound or product therewith and then pumping the resulting liquor onto a mass of cupriferous ore compound or product and leaching said second mentioned mass therewith.

16. The process of extracting copper from cupriferous ores, compounds or products, which includes increasing the leaching power of a leach by leaching a mass of cupriferous ore, compound or product therewith and then pumping the resulting liquor through a mass of pyritic material containing copper, and then pumping the resulting liquor onto a mass of cupriferous ore, compound or product and leaching said last mentioned mass therewith.

In testimony whereof I have signed this specification.

JOSEPH IRVING.